(12) United States Patent
Ahmadiannamini et al.

(10) Patent No.: US 11,786,841 B2
(45) Date of Patent: Oct. 17, 2023

(54) SYSTEMS AND METHODS FOR PURIFYING SOLVENTS

(71) Applicant: Fujifilm Electronic Materials U.S.A., Inc., N. Kingstown, RI (US)

(72) Inventors: Pejman Ahmadiannamini, Gilbert, AZ (US); Bryan Hinzie, Gilbert, AZ (US)

(73) Assignee: Fujifilm Electronic Materials U.S.A., Inc., N. Kingstown, RI (US)

( * ) Notice: Subject to any disclaimer, the term of this patent is extended or adjusted under 35 U.S.C. 154(b) by 0 days.

(21) Appl. No.: 17/149,836

(22) Filed: Jan. 15, 2021

(65) Prior Publication Data

US 2021/0220754 A1 Jul. 22, 2021

Related U.S. Application Data

(60) Provisional application No. 62/961,860, filed on Jan. 16, 2020.

(51) Int. Cl.

| | | |
|---|---|---|
| *B01D 15/36* | (2006.01) |
| *B01D 61/08* | (2006.01) |
| *B01D 69/02* | (2006.01) |
| *B01D 71/26* | (2006.01) |
| *B01D 71/56* | (2006.01) |
| *B01D 24/00* | (2006.01) |
| *B01D 61/02* | (2006.01) |
| *B01D 71/36* | (2006.01) |

(52) U.S. Cl.
CPC ......... *B01D 15/361* (2013.01); *B01D 24/008* (2013.01); *B01D 61/026* (2022.08); *B01D 61/08* (2013.01); *B01D 69/02* (2013.01); *B01D 71/26* (2013.01); *B01D 71/36* (2013.01); *B01D 71/56* (2013.01); *B01D 2239/0414* (2013.01); *B01D 2311/25* (2013.01); *B01D 2311/2623* (2013.01)

(58) Field of Classification Search
CPC .. B01D 15/361; B01D 15/362; B01D 15/363; B01D 61/08; B01D 2311/2623; B01D 2325/14; B01D 2325/16
See application file for complete search history.

(56) References Cited

U.S. PATENT DOCUMENTS

| | | | |
|---|---|---|---|
| 6,372,022 B1 * | 4/2002 | Hoffman | C01B 7/0731 95/227 |
| 10,322,952 B1 | 6/2019 | Bader | |
| 2004/0211724 A1 | 10/2004 | Gibson et al. | |

(Continued)

FOREIGN PATENT DOCUMENTS

| | | |
|---|---|---|
| CN | 1887864 | 1/2007 |
| JP | 2003-112060 | 4/2003 |

(Continued)

OTHER PUBLICATIONS

International Search Report and Written Opinion of the International Searching Authority for International Application No. PCT/US2021/013546, dated Apr. 27, 2021.

(Continued)

*Primary Examiner* — Bradley R Spies
(74) *Attorney, Agent, or Firm* — Fish & Richardson P.C.

(57) ABSTRACT

The present disclosure is directed to methods and systems of purifying solvents. The purified solvents can be used for cleaning a semiconductor substrate in a multistep semiconductor manufacturing process.

22 Claims, 1 Drawing Sheet

(56) References Cited

U.S. PATENT DOCUMENTS

| | | | |
|---|---|---|---|
| 2006/0070950 A1 | 4/2006 | Rasmussen et al. | |
| 2009/0039019 A1* | 2/2009 | Raman | B01D 69/147 |
| | | | 210/490 |
| 2009/0277838 A1 | 11/2009 | Liu et al. | |
| 2010/0297551 A1* | 11/2010 | Teranishi | C08F 220/1811 |
| | | | 430/319 |
| 2013/0312791 A1 | 11/2013 | Zhang et al. | |
| 2015/0343391 A1* | 12/2015 | Ly | C07C 29/76 |
| | | | 210/259 |
| 2016/0089622 A1* | 3/2016 | Takashima | G03F 7/16 |
| | | | 252/364 |
| 2017/0090293 A1* | 3/2017 | Nakata | G03F 7/168 |
| 2017/0259229 A1* | 9/2017 | Chou | B01F 35/2132 |
| 2018/0290109 A1* | 10/2018 | Jaber | B01D 69/02 |
| 2019/0064672 A1 | 2/2019 | Murayama et al. | |
| 2019/0275454 A1 | 9/2019 | Wendland et al. | |
| 2020/0384416 A1 | 12/2020 | Omatsu et al. | |

FOREIGN PATENT DOCUMENTS

| | | | |
|---|---|---|---|
| WO | WO 2013/151654 | 10/2013 | |
| WO | WO 2017/205722 | 11/2017 | |
| WO | WO 2019/181386 | 9/2019 | ............ B21K 1/08 |
| WO | WO 2019/181435 | 9/2019 | |
| WO | WO 2019/191520 | 10/2019 | |

OTHER PUBLICATIONS

Extended European Search Report in European Appln No. 21741984.5, dated Nov. 29, 2022, 8 pages.

Office Action in Chinese Appln. No. 202180021275.1, dated Mar. 9, 2023, 22 pages (with English translation).

Office Action in Chinese Appln. No. 202180021275.1, dated Aug. 7, 2023 23 pages (with English translation).

* cited by examiner

SYSTEMS AND METHODS FOR PURIFYING SOLVENTS

CROSS-REFERENCE TO RELATED APPLICATION

The present application claims priority to U.S. Provisional Application Ser. No. 62/961,860, filed on Jan. 16, 2020, the contents of which are hereby incorporated by reference in their entirety.

FIELD OF THE DISCLOSURE

The present disclosure relates to systems and methods for purifying solvents (e.g., organic solvents). In particular, the present disclosure relates to systems and methods that can be used to obtain organic solvents having a very low amount of metal impurities.

BACKGROUND OF THE DISCLOSURE

The semiconductor industry has achieved rapid improvements in integration density of electronic components, which are arisen from continuous reductions in the component size. Ultimately, more of the smaller components are afforded to be integrated into a given area. These improvements are mostly due to the development of new precision and high resolution processing techniques.

During the manufacturing of high resolution integrated circuits (ICs), various processing liquids will come into contact with a bare wafer or a film-coated wafer. For example, the fabrication of a fine metal interconnection typically involves a procedure of coating a base material with a pre-wetting liquid before the base material is coated with a composite liquid to form a resist film. These processing liquids, containing proprietary ingredients and various additives, are known to be a source of contamination of IC wafer.

It is believed that even if a trace amount of contaminants is mixed into these chemical liquids, such as a wafer pre-wetting liquid or a developer solution, the resulting circuit patterns may have defects. It is known that the presence of very low levels of metal impurities, as low as 1.0 ppt, may interfere with the performance and stability of semiconductor devices. And depending on the kind of metallic contaminants, oxide property can deteriorate, inaccurate patterns can be formed, electrical performance of semiconductor circuits can be impaired, which eventually adversely impact manufacturing yields.

The contamination of impurities, such as metal impurities, fine particles, organic impurities, moisture, and the like, can be inadvertently introduced in a chemical liquid during various stages of the manufacturing of the chemical liquid. Examples include impurities that are presented in a raw material, or a by-product generated or an unreacted reactant remained when the chemical liquid is manufactured, or foreign matters eluded or extracted from the surface of the manufacturing apparatus or from a container equipment, reaction vessels, or the like used in transporting, storing or reacting. Hence, a reduction or removal of insoluble and soluble contaminants from these chemical liquids used for the production of highly precise and ultra-fine semiconductor electronic circuits is a basic assurance of producing defective-free ICs.

In this respect, it is imperative to significantly improve and to rigorously control the standard and quality of chemical liquid manufacturing processes and systems in order to form high purity chemical liquids, which are indispensable in the fabrication of ultra-fine and immensely precise semiconductor electronic circuits.

SUMMARY OF THE DISCLOSURE

Accordingly, to form highly precise integrated circuits, the demands for ultra-pure chemical liquids, and the quality improvement and control of theses liquids become very critical. Specific key parameters targeted for quality improvement and control include: liquid and on-wafer metal reduction, liquid and on-wafer particle count reduction, on-wafer defect reduction, and organic contaminant reduction.

In view of the above, the present disclosure is to provide particularly a purification system and a method of purifying a solvent (e.g., an organic solvent) using the same for preparing a solvent targeted for semiconductor manufacturing, in which an ultra-pure solvent is produced with the amount of metallic impurities in the solvent managed within predetermined ranges and without the generation or introduction of unknown and unwanted substances. Hence, the occurrence of residue and/or particle defects is suppressed and the yield of semiconductor wafer is improved. In addition, the inventors found unexpectedly that purifying a solvent using both an anionic ion exchange filter containing a positively charged ion exchange resin and a cationic ion exchange filter containing a negatively charged ion exchange resin can result in a purified solvent having a relatively low amount of metal impurities (e.g., metal impurities containing Cu, Fe, Cr, K, Ni, and Zn).

In one aspect, the disclosure features a method of purifying an organic solvent that includes passing the organic solvent through first and second filter units to obtain a purified organic solvent. The first filter unit includes a first housing and at least one first filter in the first housing, and the first filter includes a filtration medium containing a positively charged ion exchange resin. The second filter unit includes a second housing and at least one second filter in the second housing, and the at least one second filter includes a filtration medium containing a negatively charged ion exchange resin.

In another aspect, the disclosure features a system that includes first and second filter units in fluid communication with each other. The first filter unit includes a first housing and at least one first filter in the first housing, and the first filter includes a filtration medium containing a positively charged ion exchange resin. The second filter unit includes a second housing and at least one second filter in the second housing, and the at least one second filter includes a filtration medium containing a negatively charged ion exchange resin.

Embodiments can include on or more of the following features.

In some embodiments, the filtration medium in the first or second filter includes a polyamide (e.g., a nylon), a polyolefin (e.g., a high density polyethylene), a fluoropolymer (e.g., polytetrafluoroethylene), or a copolymer thereof.

In some embodiments, the filtration medium in the first filter includes a polyamide (e.g., a nylon). In some embodiments, the filtration medium in the first filter includes quaternary ammonium groups.

In some embodiments, the filtration medium in the second filter includes high density polyethylene. In some embodiments, the filtration medium in the second filter includes sulfonate groups.

In some embodiments, the first filter unit includes 1 to 20 first filters, and the second filter unit includes 1 to 20 second filters.

In some embodiments, passing the organic solvent through the first or second filter unit is performed at a temperature of at most about 80° F. In some embodiments, the method further includes passing the organic solvent through at least one heat exchanger to maintain the temperature of the organic solvent at most about 80° F. In some embodiments, the at least one heat exchanger is disposed upstream of the first and second filter units, between the first and second filter units, or downstream of the first and second filter units.

In some embodiments, the method further includes passing the organic solvent through at least one particle removal filter unit, in which the at least one particle removal filter unit is disposed upstream of the first and second filter units, between the first and second filter units, or downstream of the first and second filter units. In some embodiments, the method further includes moving the purified solvent to a packaging station.

In some embodiments, the organic solvent includes cyclohexanone, ethyl lactate, n-butyl acetate, propylene glycol monomethyl ether, propylene glycol monomethyl ether acetate, 4-methyl-2-pentanol, or propylene carbonate.

In some embodiments, the organic solvent comprises metal impurities comprising a metal selected from the group consisting of alkali metals, alkaline earth metals, main group metals, transition metals, and lanthanide metals. In some embodiments, the metal impurities comprises a metal selected from the group consisting of Cu, Fe, Cr, K, Ni, and Zn.

In some embodiments, the purified organic solvent includes a metal impurity at an amount of at most about 15 ppt of the purified organic solvent.

DETAILED DESCRIPTION OF THE DISCLOSURE

As defined herein, unless otherwise noted, all percentages expressed should be understood to be percentages by weight to the total weight of a composition. Unless otherwise noted, ambient temperature is defined to be between about 16 and about 27 degrees Celsius (° C.). The term "solvent" mentioned herein, unless otherwise noted, refers to a single solvent or a combination of two or more (e.g., three or four) solvents. In the present disclosure, "ppm" means "parts-per-million", "ppb" means "parts-per-billion" and "ppt" means "parts-per-trillion".

In general, the disclosure features systems and methods for purifying a solvent (e.g., an organic solvent). The solvent mentioned herein can be used as a wafer processing solution (such as a pre-wetting liquid, a developer solution, a rinsing solution, a cleaning solution, or a stripping solution), or a solvent for a semiconductor material used in a semiconductor manufacturing process.

Prior to being subjected to a purification method of the present disclosure, a solvent may contain an undesirable amount of contaminants and impurities. After the solvent is processed by the purification method of the present disclosure, substantial amounts of the contaminants and impurities can be removed from the solvent. A pre-processed solvent is also referred to in the present disclosure as an "unpurified solvent". The pre-processed solvent can be synthesized in house or commercially available via purchasing from a supplier. A post-processed solvent is also referred to in the present disclosure as a "purified solvent". A "purified solvent" may include impurities limited within predetermined ranges.

In general, the solvent mentioned herein can include at least one (e.g., two, three, or four) organic solvent, such as an alcohol, an ether, a hydrocarbon, a halogenated hydrocarbon, an ester, a ketone, or a carbonate. Examples of suitable organic solvents include methanol, ethanol, 1-propanol, isopropanol, n-propanol, 2-methyl-1-propanol, n-butanol, 2-butanol, tert-butanol, 1-pentanol, 2-pentanol, 3-pentanol, n-hexanol, cyclohexanol, 2-methyl-2-butanol, 3-methyl-2-butanol, 2-methyl-1-butanol, 3-methyl-1-butanol, 2-methyl-1-pentanol, 2-methyl-2-pentanol, 2-methyl-3-pentanol, 3-methyl-1-pentanol, 3-methyl-2-pentanol, 3-methyl-3-pentanol, 4-methyl-1-pentanol, 4-methyl-2-pentanol, 2-ethyl-1-butanol, 2,2-dimethyl-3-pentanol, 2,3-dimethyl-3-pentanol, 2,4-dimethyl-3-pentanol, 4,4-dimethyl-2-pentanol, 3-ethyl-3-heptanol, 1-heptanol, 2-heptanol, 3-heptanol, 2-methyl-2-hexanol, 2-methyl-3-hexanol, 5-methyl-1-hexanol, 5-methyl-2-hexanol, 2-ethyl-1-hexanol, methylcyclohexanol, trimethylcyclohexanol, 4-methyl-3-heptanol, 6-methyl-2-heptanol, 1-octanol, 2-octanol, 3-octanol, 2-propyl-1-pentanol, 2,6-dimethyl-4-heptanol, 2-nonanol, 3,7-dimethyl-3-octanol, ethylene glycol, propylene glycol, diethyl ether, dipropyl ether, diisopropyl ether, butyl methyl ether, butyl ethyl ether, butyl propyl ether, dibutyl ether, diisobutyl ether, tert-butyl methyl ether, tert-butyl ethyl ether, tert-butyl propyl ether, di-tert-butyl ether, dipentyl ether, diisoamyl ether, cyclopentyl methyl ether, cyclohexyl methyl ether, bromomethyl methyl ether, α,α-dichloromethyl methyl ether, chloromethyl ethyl ether, 2-chloroethyl methyl ether, 2-bromoethyl methyl ether, 2,2-dichloroethyl methyl ether, 2-chloroethyl ethyl ether, 2-bromoethyl ethyl ether, (±)-1,2-dichloroethyl ethyl ether, 2,2,2-trifluoroethyl ether, ethyl vinyl ether, butyl vinyl ether, allyl ethyl ether, allyl propyl ether, allyl butyl ether, diallyl ether, 2-methoxypropene, ethyl-1-propenyl ether, cis-1-bromo-2-ethoxyethylene, 2-chloroethyl vinyl ether, allyl-1,1,2,2-tetrafluoroethyl ether, octane, isooctane, nonane, decane, methylcyclohexane, decalin, xylene, ethylbenzene, diethylbenzene, cumene, sec-butylbenzene, cymene, dipentene, methyl pyruvate, Zo monomethyl ether, propylene glycol monomethyl ether, propylene glycol monoethyl ether, propylene glycol monopropyl ether, propylene glycol monomethyl ether acetate, ethyl lactate, methyl methoxypropionate, cyclopentanone, cyclohexanone, n-butyl acetate, γ-butyrolactone, diisoamyl ether, isoamyl acetate, chloroform, dichloromethane, 1,4-dioxane, hexyl alcohol, 2-heptanone, isoamyl acetate, propylene carbonate, and tetrahydrofuran.

In some embodiments, the solvent is a pre-wetting liquid. Examples of a pre-wetting liquid include at least one of cyclopentanone (CyPe), cyclohexanone (CyH), monomethyl ether, propylene glycol monomethyl ether (PGME), propylene glycol monoethyl ether (PGEE), propylene glycol monomethyl ether acetate (PGMEA), propylene glycol monopropyl ether (PGPE), and ethyl lactate (EL). In other embodiments, the solvent can be a developer solution such as n-butyl acetate, or a rinsing liquid such as 4-methyl-2- pentanol (MIBC). In some embodiments, the solvent can be a rinse solvent used in a wafer manufacturing process, such as isopropyl alcohol.

In some embodiments, the pre-processed or unpurified organic solvent can have a purity of at least about 95% (e.g., at least about 96%, at least about 97%, at least about 98%, or at least about 99%). In some embodiments, the post-processed or purified organic solvent obtained from the methods described herein can have a purity of at least about 99.5% (e.g., at least about 99.9%, at least about 99.95%, at least about 99.99%, at least about 99.995%, or at least about 99.999%). As mentioned herein, "purity" refers to the weight percentage of the solvent in the total weight of the liquid. The content of the organic solvent in a liquid can be measured by using a gas chromatography mass spectrometry (GCMS) device (e.g., a thermal desorption (TD) GC-MS device).

In some embodiments, the boiling point of the solvent described herein is at most about 200° C. (e.g., at most about 150° C.) or at least about 50° C. (e.g., at least about 100° C.) from a point of improving manufacturing yield of a semiconductor chip. In this disclosure, the boiling point means a boiling point measured at 1 atm.

In general, impurities contained in a pre-processed organic solvent can include metallic impurities, particles, and others such as organic impurities and moisture.

As described herein, metal impurities can be in a form of a solid (e.g., metal simplex, particulate metal-containing compound, and the like). In some embodiments, metal impurities can include a metal selected from the group consisting of alkali metals, alkaline earth metals, main group metals, transition metals, and lanthanide metals. Examples of common metallic impurities include heavy metals such as copper (Cu), iron (Fe), aluminum (Al), chromium (Cr), lead (Pb), nickel (Ni), zinc (Zn), and ionic metals such as sodium (Na), potassium (K), and calcium (Ca). Depending on the type of metal, metal impurities can deteriorate oxide integrity, degrade MOS gate stacks, and reduce lifetime of devices. In an organic solvent purified by the methods described herein, the total trace metal content is preferred to be within a predetermined range of 0 to about 300 ppt (e.g., 0 to about 150 ppt) in mass and the amount of each metal is preferred to be within a predetermined range of 0 to about 15 ppt (e.g., 0 to about 10 ppt).

In an organic solvent purified by the methods described herein, the total trace metal content is preferred to be within a predetermined range of from 0 (e.g., at least about 1 ppt, at least about 5 ppt, or at least about 10 ppt) to at most about 200 ppt (e.g., at most about 180 ppt, at most about 160 ppt, at most about 150 ppt, at most about 140 ppt, at most about 120 ppt, at most about 100 ppt, at most about 50 ppt, or at most about 20 ppt) in mass, and the amount of each trace metal (e.g., Fe, Ni, Cr, Zn, Cu, K, Na, or Ca) is preferred to be within a predetermined range of from 0 (e.g., at least about 1 ppt, at least about 2 ppt, or at least about 3 ppt) to at most about 50 ppt (e.g., at most about 40 ppt, at most about 30 ppt, at most about 20 ppt, at most about 15 ppt, at most about 10 ppt, at most about 8 ppt, at most about 6 ppt, at most about 5 ppt, at most about 4 ppt, at most about 3 ppt, or at most about 2 ppt) in mass.

In the present disclosure, substances having a size of 0.03 μm or greater are referred to as "particles" or "particulates". Examples of particles include dust, dirt, organic solid matters, and inorganic solid matters. The particles can also include impurities of colloidalized metal atoms. The type of the metal atoms that are easily colloidalized is not particularly limited, and can include at least one metal atom selected from the group consisting of Na, K, Ca, Fe, Cu, Mg, Mn, Li, Al, Cr, Ni, Zn, and Pb. In an organic solvent purified by the methods described herein, the total number of the particles having a size of 0.03 μm or more is preferred to be within a predetermined range of at most 100 (e.g., at most 80, at most 60, at most 50, at most 40, or at most 20) per 1 ml of the solvent. The number of "particles" in a liquid medium can be counted by a light scattering type in-liquid particle counter and is referred as LPC (liquid particle count).

As described herein, organic impurities are different from the organic solvent and refer to organic matters that are contained in the content of 5000 mass ppm or smaller with respect to the total mass of the liquid containing the organic solvent and the organic impurities. Organic impurities can be volatile organic compounds that are present in ambient air even inside a clean-room. Some of the organic impurities originate from the shipping and storage equipment, while some are presented in a raw material from the start. Other examples of organic impurities include a by-product generated when the organic solvent is synthesized and/or an unreacted reactant.

The total content of the organic impurities in a purified organic solvent is not particularly limited. From a point of improving the manufacturing yield of a semiconductor device, the total content of the organic impurities can be 0.1 to 5000 mass ppm (e.g., 1 to 2000 mass ppm, 1 to 1000 mass ppm, 1 to 500 mass ppm, or 1 to 100 mass ppm) in a purified organic solvent. The content of the organic impurities in the solvent described herein can be measured by using a gas chromatography mass spectrometry (GC-MS) device.

Figure 1:
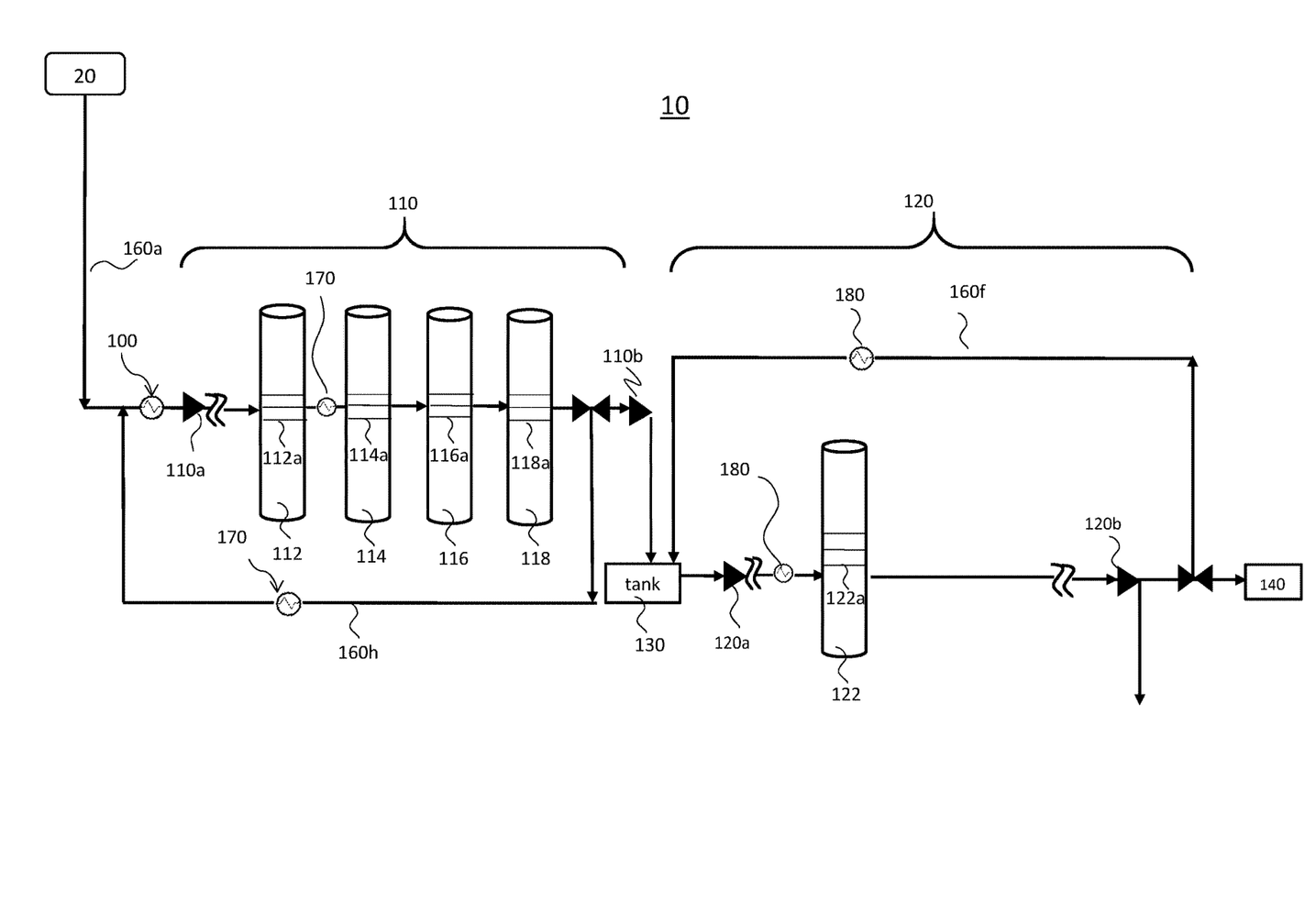
FIG. 1 is a schematic diagram showing an example of a purification system adopted in a method of purifying an organic solvent in accordance with some embodiments of the present disclosure.

FIG. 1 is a schematic diagram showing a configuration of a purification system according to some embodiments of the present disclosure. As shown in FIG. 1, the purification system 10 includes a supply unit 20, a first filtration system 110, a storage tank 130, a second filtration system 120, and a packaging station 140, all of which are in fluid communication with each other (e.g., through one or more conduits).

In general, supply unit 20 (e.g., a tank) is configured to hold or transport a starting material (e.g., a pre-processed or unpurified organic solvent). The starting material can be processed by purification system 10 to produce or manufacture a purified organic solvent in which the number of unwanted contaminants (e.g., particulates, organic impurities, metallic impurities) are limited within predetermined ranges. The type of supply unit 20 is not particularly limited as long as it continuously or intermittently supplies the starting material to the other components of purification system 10. In some embodiments, supply unit 20 can include a material receiving tank, a sensor such as a level gauge (not shown), a pump (not shown), and/or a valve (not shown) for controlling the flow of the starting material (not shown). In FIG. 1, purification system 10 includes one supply unit 20. However, in some embodiments, a plurality of supply units 20 can be provided (e.g., in parallel or series) for each type of starting materials to be processed by purification system 10.

Purification system 10 can include at least one first filtration system 110 and at least one second filtration system 120. In general, first filtration system 110 performs an initial filtration of the starting material (e.g., unpurified organic solvent) to remove the majority of the impurities and/or particles, and second filtration system 120 performs a subsequent filtration to remove the remaining impurities and fine particles to obtain a ultra-high purity organic solvent. In some embodiments, each of first filtration system 110 and second filtration system 120 can include one or more filter units, each of which can include a filter housing and one or more filters (e.g., 1-20 filters).

In some embodiments, purification system 10 can optionally include at least one temperature control unit 100 for setting or maintaining the temperature of the organic solvent within a certain temperature range such that the organic solvent is maintained at a substantially consistent temperature during the purification process. As described herein, a temperature control unit can include, but are not limited to, a commercial re-circulating heating/cooling unit, a condenser, or a heat exchanger, which can be installed, for example, on a conduit in purification system 10. Temperature control unit 100 can be configured, for example, along conduit 160a between supply unit 20 and the first filtration system 110. In some embodiments, temperature control unit 100 can set the temperature of the organic solvent to at most about 80° F. (e.g., at most about 75° F., at most about 70° F., at most about 65° F., or at most about 60° F.) and/or at least about 30° F. (e.g., at least about 40° F., at least about 50° F., or at least about 60° F.). In some embodiments, because pumps used in purification system 10 can generate heat and increase solvent temperature, purification system 10 can include additional temperature control unit (such as units 170 and 180 described below) at suitable locations to maintain the temperature of the solvent at a predetermined value.

Referring to FIG. 1, first filtration system 110 can include an optional temperature control unit 100, a supply port 110a, one or more (e.g., two, three, four, five, or ten) filter units (e.g., units 112, 114, 116, and 118), an outflow port 110b, an optional recirculation conduit 160h, and one or more optional temperature control units 170, all of which are in fluid communication with each other (e.g., through one or more conduits).

In some embodiments, each filter unit in first filtration system 110 can include a filter housing and one or more (e.g., 2, 3, 4, 5, or 6) filters in the filter housing. Each filter can include a filtration medium having an appropriate average pore size. The filters can be arranged in parallel or in series in the filter housing. During use, when two filters are arranged in parallel, a solvent to be purified passes these two filters in parallel (i.e., substantially at the same time). On the other hand, when two filters are arranged in series, a solvent to be purified passes these two filters sequentially during use. In some embodiments, some filter units can include a plurality of filters in parallel in the filter housing to increase flow rate and improve productivity.

For example, first filtration system 110 shown in FIG. 1 includes four filter units (i.e., units 112, 114, 116, and 118), each of which includes a filter housing and one or more filters (e.g., filters 112a, 114a, 116a, and 118a) in the filter housing. In other embodiments, first filtration system 110 can also include other purification modules (not shown) in addition to the four filter units shown in FIG. 1.

Referring to FIG. 1, filters 112a, 114a, 116a, and 118a can be different in functionality or property and offer different purification treatments. In some embodiments, certain filters (e.g., 112a, 114a, 116a, or 118a) accommodated within the corresponding filter units (e.g., 112, 114, 116, and 118), respectively, can have the same or similar purification function, physiochemical properties, pore size and/or construction material. In some embodiments, each filter in a filter unit can independently be selected from the group consisting of a particle removal filter, an ion exchange filter, and an ion absorption filter.

In some embodiments, filter unit 112 can include a filter housing and at least one (e.g., two or three) filter 112a in the filter housing. In some embodiments, when filter unit 112 includes two or more filters 112a, filters 112a can be arranged in parallel.

In some embodiments, filter 112a can be a particle removal filter to remove relatively large particles from the organic solvent. In some embodiments, filter 112a can include a filtration medium having an average pore size of at most about 200 nm (e.g., at most about 180 nm, at most about 160 nm, at most about 150 nm, at most about 140 nm, at most about 120, or at most about 100 nm) and/or at least about 50 nm (e.g., at least about 60 nm, at least about 70 nm, at least about 80 nm, at least about 90 nm, or at least about 100 nm). Within the above range, it is possible to reliably remove foreign matters such as impurities or aggregates contained in the organic solvent while suppressing clogging of filter 112a.

Examples of suitable materials of filter 112a include a fluoropolymer (e.g., polytetrafluoroethylene (PTFE), perfluoroalkoxy alkane polymers (PFA), or a modified polytetrafluoroethylene (MPTFE)), a polyamide resin such as nylon (e.g., nylon 6 or nylon 66), a polyolefin resin (including high density and ultrahigh molecular weight resins) such as polyethylene (PE) and polypropylene (PP). For example, the filtration medium in a particle removal filter can be made of at least one polymer selected from the group consisting of polypropylene (e.g., high density polypropylene), polyethylene (e.g., high density polyethylene (HDPE), or ultra high molecular weight polyethylene (UPE)), nylon, polytetrafluoroethylene, or a perfluoroalkoxy alkane polymer. A filter made of the above material can effectively remove foreign matters (e.g., those having high polarity) which are likely to cause residue defects and/or particle defects, and to efficiently reduce the content of the metal components in the chemical liquid. In some embodiments, filter unit 112 can include one filter 112a that has an average pore size of about 200 nm and is made from polypropylene.

In some embodiments, filter unit 118 can include a filter housing and at least one (e.g., two or three) filters 118a in the filter housing. Filter 118a can be a particle removal filter to remove relative small particles from the organic solvent. In some embodiments, filter 118a can include a filtration medium having an average pore size of at most about 50 nm (e.g., at most about 45 nm, at most about 40 nm, at most about 35 nm, at most about 30 nm, at most about 25 nm, or at most about 20 nm) and/or at least about 10 nm (e.g., at least about 15 nm, at least about 20 nm, at least about 25 nm, or at least about 30 nm). In some embodiments, the average pore size of the filtration medium in filter 118a can be smaller than the average pore size of the filtration medium in filter 112a. In such embodiments, filters 118a can be used to remove particles smaller than those removed by filters 112a.

In some embodiments, filter 118a in filter unit 118 can include an ion absorption membrane to remove relative small particles and/or metal ions from the organic solvent. An ion adsorption membrane can have a porous membrane material and can have an ion exchange function. Examples of suitable materials that can be used to make an ion adsorption membrane include, but are not limited to, cellulose, diatomaceous earth, film material of microfiltration membrane such as a polyamide resin such as nylon (e.g., nylon 6 or nylon 66), polyethylene (e.g., high density polyethylene or ultra high molecular weight polyethylene), polypropylene, polystyrene, resin having imide group, resin having amide group and imide group, a fluororesin (e.g., polytetrafluoroethylene (PTFE), perfluoroalkoxy alkane polymers (PFA), or a modified polytetrafluoroethylene (MPTFE)), a membrane material having an ion exchange ability functional group introduced therein, or the like. For example, filters 118a can include at least one polymer selected from the group consisting of polypropylene (e.g., high density polypropylene), polyethylene (e.g., high density polyethylene, or ultra high molecular weight polyethylene), nylon, polytetrafluoroethylene, or a perfluoroalkoxy alkane polymer.

In some embodiments, at least some (e.g., all) of the filters 118a can be arranged in filter unit 118 in parallel and the remaining filters 118a in filter unit 118 (if any) can be arranged in series. When two filters are arranged in parallel, the organic solvent to be purified can go through the two filters in parallel (e.g., at the same time). In some embodiments, the number of filter 118a (e.g., those arranged in parallel) in filter unit 118 can be larger than the number of filter 112a in filter unit 112. For example, when filter unit 112 includes one filter 112a, filter unit 118 can have two or three filters 118a arranged in parallel. Without wishing to be bound by theory, it is believed that an advantage of having a larger number of filters in filter unit 118 arranged in parallel than the number of filters in filter unit 112 is that system 10 can accommodate an increased flow rate and have an improved productivity, or maintain the flow rate of system 10 without increasing the back pressure of the system. Without wishing to be bound by theory, it is believed that, when the average pore size of the filtration medium in filter 118a is smaller than the average pore size of the filtration medium in filter 112a, the flow rate of an organic solvent passing through filter 118a can be reduced compared to the flow rate of the organic solvent passing through filter 112a. Thus, it is believed that having a larger number of filters 118a arranged in parallel can increase the flow rate and productivity of system 10.

In some embodiments, filter unit 118 can include three filters 118a that are arranged in parallel, have an average pore size of about 50 nm, and are made from ultra high molecular weight polyethylene.

In some embodiments, purification system 10 can include two ion exchange filter units, i.e., filter units 114 and 116. In some embodiments, one of the filter units 114 and 116 is a cationic ion exchange filter unit (i.e., including one or more filters containing a negatively charged ion exchange resin) and the other of the filter units 114 and 116 is an anionic ion exchange filter unit (i.e., including one or more filters containing a positively charged ion exchange resin). For example, in some embodiments, unit 114 can be a cationic ion exchange filter unit and unit 116 can be an anionic ion exchange filter unit. In other embodiments, unit 116 can be a cationic ion exchange filter unit and unit 114 can be an anionic ion exchange filter unit. Without wishing to be bound by theory, the inventors surprisingly found that including both a cationic ion exchange filter unit and an anionic ion exchange filter unit in purification system 10 can significantly reduce the amount of metal impurities (e.g., those containing Cu, Fe, Cr, K, Ni, and Zn) in the purified organic solvent, compared to a system in which only one type of ion exchange filter unit is used. Further, without wishing to be bound by theory, it is believed that the above surprising result may be due to the fact that metal impurities exist in an organic solvent in the form of both positively charged species and negatively charged species, contrary to the conventional wisdom that metals only exist as positive ions in an organic solvent.

In some embodiments, filter unit 114 can include a filter housing and at least one (e.g., two or three) filter 114a in the filter housing. In some embodiments, at least some (e.g., all) of the filters 114a can be arranged in filter unit 114 in parallel and the remaining filters 114a (if any) can be arranged in series.

In some embodiments, filter 114a in filter unit 114 can be a cationic ion exchange filter that includes a filtration medium containing a negatively charged ion exchange resin. For example, filter 114a can include one or more ion-exchange resin membranes to remove positively charged particles and/or cationic metal ions from the organic solvent. The cationic ion-exchange resin membrane used in the present disclosure is not particularly limited, and filters including an ion exchange resin having a suitable ion-exchange group immobilized to a resin membrane can be used. Examples of such ion-exchange resin membranes include strongly acidic cation-exchange resins having a cation-exchange group (such as a sulfonic acid or sulfonate group) chemically modified on the resin membrane. Examples of suitable resin membranes include those containing cellulose, diatomaceous earth, nylon (a resin having an amide group), a polyolefin such as polyethylene (e.g., high density polyethylene or ultra high molecular weight polyethylene), polypropylene, or polystyrene, a resin having an imide group, a resin having an amide group and an imide group, a fluoropolymer (e.g., polytetrafluoroethylene or a perfluoroalkoxy alkane polymer), or a combination thereof. In some embodiments, the ion-exchange resin membrane can be a membrane having an integral structure of a particle-removing membrane and an ion-exchange resin membrane. Polyalkylene (e.g., PE or PP) membranes with a cation-exchange group (e.g., a sulfonate group) chemically modified thereon are preferred. Filters with cation-exchange resin membranes used in the present disclosure can be commercially available filters with metal ion removal functionality. A commercial example of such a cation-exchange filter is IonKleen available from Pall Corporation (Port Washington, N.Y.). These filters can be selected based on the ion exchange efficiency and have an estimated pore size in the range of about 100 nm to about 500 nm.

In some embodiments, filter unit 114 can include at least three (e.g., four, five, six, or seven) filters 114a that are arranged in parallel, and include high density polyethylene modified with sulfonate groups as a filtration medium.

In some embodiments, filter unit 116 can include a filter housing and at least one (e.g., two or three) filter 116a in the filter housing. In some embodiments, at least some (e.g., all) of the filters 116a can be arranged in filter unit 116 in parallel and the remaining filters 116a (if any) can be arranged in series.

In some embodiments, filter 116a in filter unit 116 can be an anionic ion exchange filter that includes a filtration medium containing a positively charged ion exchange resin. For example, filter 116a can include one or more ion-exchange resin membranes to remove negatively charged particles and/or anionic metal-containing species from the organic solvent. The anionic ion-exchange resin membrane used in the present disclosure is not particularly limited, and filters including an ion exchange resin having a suitable ion-exchange group immobilized to a resin membrane can be used. Examples of such ion-exchange resin membranes include resins having an anion-exchange group (such as a quaternary ammonium group) chemically modified on the resin membrane. Examples of suitable resin membranes include those containing cellulose, diatomaceous earth, nylon (a resin having an amide group), a polyolefin such as polyethylene (e.g., high density polyethylene or ultra high molecular weight polyethylene), polypropylene, or polystyrene, a resin having an imide group, a resin having an amide group and an imide group, a fluoropolymer (e.g., polytetrafluoroethylene or a perfluoroalkoxy alkane polymer), or a combination thereof. In some embodiments, the ion-exchange resin membrane can be a membrane having an integral structure of a particle-removing membrane and an ion-exchange resin membrane. Polyamide (e.g., nylon) membranes with an anion-exchange group (e.g., a quaternary ammonium group) chemically modified thereon are preferred. Filters with anion-exchange resin membranes used in the present disclosure can be commercially available filters with metal ion removal functionality. A commercial example of such an anion-exchange filter is Nylon EMZ available from 3M Purification Inc. (Meriden, Conn.). These filters can be selected based on the ion exchange efficiency and have an estimated pore size in the range of from about 40 nm to about 450 nm.

In some embodiments, filter unit 116 can include at least three (e.g., four, five, six, or seven) filters 116a that are arranged in parallel, and include nylon modified with quaternary ammonium groups as a filtration medium.

In some embodiments, the number of filter 114a or 116a (e.g., those arranged in parallel) in filter unit 114 or 116 can be larger than the number of filter 112a in filter unit 112. For example, when filter unit 112 includes one filter 112a, filter unit 114 or 116 can have two or three filters 114a or 116a (e.g., arranged in parallel). Without wishing to be bound by theory, it is believed that an advantage of having a larger number of filters in filter unit 114 or 116 arranged in parallel than the number of filters in filter unit 112 is that system 10 can accommodate an increased flow rate and have an improved productivity, or maintain the flow rate of system 10 without increasing the back pressure of the system.

Examples of the shape of the membrane material in filter 114a or 116a include a pleated type, a flat membrane type, a hollow fiber type, a porous body as described in JP-A No. 2003-112060 and the like. Since the ion adsorption membrane has porosity, it is also possible to remove a part of the fine particles.

In some embodiments, first filtration system 110 can optionally include a recirculation conduit 160h to form a recirculation loop for recirculating a partially-purified organic solvent back to first filtration system 110 and to be processed by the filters in first filtration system 110 again. In some embodiments, the partially-purified organic solvent is recirculated at least two times (e.g., at least three times, at least four times, or at least five times) before the organic solvent is transferred to storage tank 130.

In general, storage tank can be any suitable vessel for storing a chemical liquid. In some embodiments, storage tank 130 can have a suitable volume. For example, storage tank 130 can have a volume of at least about 1000 liters (e.g., at least about 2000 liters, at least about 3000 liters, or at least about 5000 liters) and/or at most about 30,000 liters (e.g., at most about 25,000 liters, at most about 20,000 liters, at most about 15,000 liters, or at most about 10,000 liters).

In some embodiments, an optional temperature control unit 170 (e.g., a heat exchanger) can be configured along recirculation conduit 160h. In such embodiments, temperature control unit 170 can be configured at a temperature of at most about 80° F. (e.g., at most about 75° F., at most about 70° F., or at most about 65° F.) and/or at least about 30° F. (e.g., at least about 40° F., at least about 50° F., or at least about 60° F.) so that the temperature of the partially-purified organic solvent is maintained at about 80° F. or below as it is being recirculated back to first filtration system 110. In the examples as shown in FIG. 1, recirculation conduit 160h is configured at the upstream side of outflow port 110b of first filtration system 110. In some embodiments, recirculation conduit 160h can be configured at the downstream side of outflow port 110b. It is understood that pumps and valves may be installed at the various conduits, outflow ports and supply ports, supply unit 20, and temperature control unit 100 of first filtration system 110 as necessary.

As in the examples illustrated in FIG. 1, first filtration system 110 can optionally include a temperature control unit 170 (e.g., a heat exchanger) configured between filter unit 112 and filter unit 114 to control the temperature of the organic solvent to at most about 80° F. (e.g., at most about 75° F., at most about 70° F., or at most about 65° F.) and/or at least about 30° F. (e.g., at least about 40° F., at least about 50° F., or at least about 60° F.) before the organic solvent is charged into and processed in filter unit 114.

It should be noted also that the position of temperature control unit 170 is not limited to the examples shown above. In some embodiments, a temperature control unit 170 can be configured upstream of filter unit 112, between filter units 114 and 116, between filter units 116 and 118, or downstream of filter unit 118. In such embodiments, another temperature control unit may or may not be installed downstream of filter unit 112 and prior to the entry of subsequent filter units (e.g., filter unit 114, 116, and/or 118). Configuring another temperature control unit downstream of filter unit 112 is optional provided that no other means or equipment (e.g., a pump), which may re-introduce thermal energy into the organic solvent, is introduced or disposed between filter unit 112 and the subsequent filter units (e.g., filter 114, 116, or 118).

In some embodiments, filter units 112, 114, 116, and 118 in first filtration system 110 may not include filter housings, and the filters 112a, 114a, 116a, and 118a can be configured un-compartmentalized in first filtration system 110. For example, first filtration system 110 can be a multistage system including replaceable filters (e.g., 112a, 114a, 116a, and 118a) that are concatenated together inside first filtration system 110, and the organic solvent can be caused to cascade through these filters. In such embodiments, a temperature control unit 170 can be configured at any position upstream of a first ion exchange filter or ion adsorption filter through which the organic solvent passes or cascades. For example, if first filtration system 110 houses, in sequence and downstream of its supply port 110a, particle removal filter A, particle removal filter B, ion exchange membrane A, ion exchange membrane B, and an ion adsorption membrane A, a temperature control unit 170 can be configured between particle removal filter B and ion exchange membrane A to have the temperature of the organic solvent adjusted and regulated to about 80° F. or below before the organic solvent passes through and is processed by the ion exchange membrane A, and by the subsequent ion exchange membrane B and an ion adsorption membrane A. It is noted that the above examples are for illustrative purposes and are not intended to be limiting.

As shown in FIG. 1, purification system 10 also includes a second filtration system 120, which is in fluid communication with and between storage tank 130 and packaging station 140. Second filtration system 120 can include a supply port 120a, one or more (e.g., two, three, four, five, or ten) filter units 122, an outflow port 120b, an optional recirculation conduit 160f, and one or more optional temperature control units 180, all of which are in fluid communication with each other (e.g., through one or more conduits). It is understood that pumps and valves may be installed at the various conduits, outflow ports and supply ports, and temperature control units in second filtration system 120 as necessary.

In some embodiments, filter unit 122 can include a filter housing and at least one filters 122*a* in the filter housing. For example, filter unit 122 can include 2, 3, 4, 5, 6, 7, 8, 9, 10, 11, 12, 13, or 14 filters 122*a* in the filter housing. Second filtration system 120 shown in FIG. 1 includes one filter unit 122. In some embodiments, second filtration system 120 can include two or more (e.g., three or four) filter units 122. In such embodiments, filter units 122 may not have separate housings, and filters 122*a* can be configured un-compartmentalized in second filtration system 120. In other embodiments, second filtration system 120 can also include other purification modules (not shown) in addition to filter unit 122.

In some embodiments, filters 122*a* can be different in functionality or property and offer different purification treatments. In some embodiments, filters 122*a* accommodated within filter unit 122 can have the same or similar purification function, physiochemical properties, pore size and/or construction material. In some embodiments, each filter 122*a* can independently be selected from the group consisting of a particle removal filter, an ion exchange filter, and an ion absorption filter.

In some embodiments, filter 122*a* can include ion absorption membranes (such as those described above with respect to filter 118*a*) to remove fine charged particles and/or metal ions in the organic solvent to be purified. In some embodiments, filter 122*a* can include a filtration medium having an average pore size (also referred to herein as the fourth average pore size) of at most about 10 nm (e.g., at most about 7 nm, at most about 5 nm, at most about 3 nm, or at most about 1 nm) and/or at least about 1 nm (e.g., at least about 3 nm, or at least about 5 nm). In some embodiments, filter 122*a* can both perform sieving functions (e.g., to remove fine particles) and ion-exchange functions (e.g., to remove charged particles and/or metal ions). In some embodiments, the average pore size of the filtration medium in filter 122*a* can be smaller than the average pore size of the filtration medium in filter 118*a*. In such embodiments, filter 122*a* can be used to remove particles smaller than those removed by filter 118*a*.

Examples of suitable materials that can be used as a filtration medium in filter 122*a* include polypropylene (e.g., high density polypropylene), polyethylene (e.g., high density polyethylene, or ultra high molecular weight polyethylene), nylon (e.g., nylon 6 or nylon 66), polytetrafluoroethylene, or a perfluoroalkoxy alkane polymer. In some embodiments, filter 122*a*, as well as filters 112*a*, 114*a*, 116*a*, and 118*a* described above, can be made from a non-fluoropolymer.

In some embodiments, filters 122*a* (e.g., ion absorption filters) can have the same characteristics (e.g., the same pore size) except that they are made from a different material. For example, in some embodiments, when the filtration medium in one filter 122*a* is made from a ultra high molecular weight polyethylene, the filtration medium in another filter 122*a* can be made from a fluoropolymer (e.g., a PTFE). Without wishing to be bound by theory, it is believed that using a combination of filters 122*a* in which their filtration media are made from different materials can maximize the reduction of impurities, particles, and metal ions to obtain an ultra-high pure organic solvent.

In some embodiments, at least some (e.g., all) of the filters 122*a* can be arranged in filter unit 122 in parallel and the remaining filters 122*a* in filter unit 122 (if any) can be arranged in series. In some embodiments, the number of filter 122*a* (e.g., those arranged in parallel) in filter unit 122 can be larger than the number of filter 118*a* in filter unit 118. For example, when filter unit 118 includes three filters 118*a*, filter unit 122 can have four or more (e.g., six) filters 122*a* arranged in parallel. Without wishing to be bound by theory, it is believed that an advantage of having a larger number of filters in filter unit 122 arranged in parallel than the filters in filter unit 118 is that system 10 can accommodate an increased flow rate and have an improved productivity. Without wishing to be bound by theory, it is believed that, when the average pore size of the filtration medium in filter 122*a* is smaller than the average pore size of the filtration medium in filter 118*a*, the flow rate of an organic solvent passing through filter 122*a* can be reduced compared to the flow rate of the organic solvent passing through filter 118*a*. Thus, it is believed that having a larger number of filters 122*a* arranged in parallel can increase the flow rate and productivity of system 10.

In some embodiments, filter unit 122 can include six filters 122*a* that are arranged in parallel, have an average pore size of about 3 nm, and are made from ultra high molecular weight polyethylene.

Referring to FIG. 1, second filtration system 120 includes an optional recirculation conduit 160*f* to form a recirculation loop for recirculating a partially-purified organic solvent back to storage tank 130 and to be processed by filter unit 122 in second filtration system 120 again. In some embodiments, the partially-purified organic solvent is recirculated at least two times (e.g., at least three times, at least four times, or at least five times) before the purification process is completed and the organic solvent is transferred to packaging station 140. In some embodiments, without wishing to be bound by theory, it is believed that recirculating the partially-purified organic solvent through second filtration system 120 more than two times may not achieve further improvement in impurities removal. In the examples as shown in FIG. 1, recirculation conduit 160*f* is configured at the downstream side of outflow port 120*b* of second filtration system 120. In other examples, recirculation conduit 160*f* can be configured at the upstream side of outflow port 120*b*.

In some embodiments, second filtration system 120 can include one or more optional temperature control unit 180 (e.g., a heat exchanger) at any suitable place. For example, temperature control unit 180 can be configured along the recirculation conduit 160*f*. In some embodiments, temperature control unit 180 can be configured between supply port 120*a* and filter unit 122 and between filter unit 122 and outflow port 120*b*. In some embodiments, temperature control unit 180 can be configured at a temperature of at most about 80° F. (e.g., at most about 75° F., at most about 70° F., or at most about 65° F.) and/or at least about 30° F. (e.g., at least about 40° F., at least about 50° F., or at least about 60° F.) so that the temperature of the organic solvent in second filtration system 120 can be maintained at about 80° F. or below.

In some embodiments, packaging station 140 can be a mobile storage tank (e.g., a tank on a tanker) or a fixed storage tank. In some embodiments, packaging station 140 can be a fluoropolymer lined equipment (e.g., the inner surface of which can include a fluoropolymer such as a PTFE).

The present disclosure also features a method of purifying a solvent (e.g., an organic solvent). In general, the purification method can include passing the solvent through at least two ion exchange filter units (e.g., filter units 114 and 116 shown in FIG. 1), in which one of the filter units is a cationic ion exchange filter unit (i.e., including one or more filters containing a negatively charged ion exchange resin) and the other of the filter units is an anionic ion exchange filter unit (i.e., including one or more filters containing a positively charged ion exchange resin).

For example, referring to FIG. 1, an unpurified or pre-processed solvent (i.e., a starting material) can be purified by purification system 10 by passing the solvent from supply unit 20 through filter units 112, 114, 116, and 118 in first filtration system 110 (in which filter units 114 and 116 are ion-exchange filter units containing differently charged ion exchange resins as described above) to be collected in storage tank 130, and passing the solvent from storage tank 130 through filter unit 122 in second filtration system 120 to packaging station 140 (e.g., having a volume of from about 100 to 1000 liters). In some embodiments, the purification methods described herein can include recirculating the solvent through the recirculation loop in second filtration system 120 (e.g., through storage tank 130, filter unit 122, and recirculation conduit 160f) at least one time (e.g., two or three times) before transferring the purified solvent to packaging station 140. In some embodiments, the purification methods described herein can include recirculating the solvent through a recirculation loop in first filtration system 110 (e.g., through filter units 112, 114, 116, and 118 and recirculation conduit 160h) at least one time (e.g., two or three times) before transferring the partially-purified solvent to storage tank 130.

In some embodiments, the unpurified or pre-processed solvent can include an organic solvent containing a metal element selected from the group consisting of sodium (Na), potassium (K), aluminum (Al), calcium (Ca), copper (Cu), iron (Fe), chromium (Cr), nickel (Ni), zinc (Zn), and lead (Pb). In some embodiments, the content of each metal component in the pre-processed solvent ranges from about 0.1 to 1000 mass ppt (e.g., 200 to 1000 mass ppt or 500 to 1000 mass ppt).

Referring to FIG. 1, when the pre-processed solvent reaches a temperature control unit (e.g., unit 100 or any subsequent temperature control unit such as units 170 and 180), the temperature of the solvent can be adjusted to a predetermined optimal temperature range (e.g., from 30° F. to 80° F., from 30° F. to 70° F., from 41° F. to 67° F., or from 50° F. to 65° F.). For example, the temperature of the solvent can be adjusted to 70° F., 68.5° F., or 67.5° F. In general, the temperature control unit can maintain or adjust the temperature of a solvent either at a particular location (e.g., before the entry of a filter) in purification system 10 or throughout the entire purification system 10.

When the number of particles and the amount of impurities detected from the purified solvent at the end of the processing by first and second filtration systems 110 and 120 are controlled within the predetermined ranges, an ultra-high purity solvent (e.g., containing 0.1 to 100 mass ppt of metal components, such as those selected from the group of metal elements consisting of Cu, Fe, Cr, K, Ni, and Zn) is produced. Subsequently, the ultra-high purity solvent can be transferred to either packaging station 140 or to a manufacturing process for making a semiconductor article.

In some embodiments, the solvent purified by the methods and systems described herein can have a purity of at least about 99.5% (e.g., at least about 99.9%, at least about 99.95%, at least about 99.99%, at least about 99.995%, or at least about 99.999%). In some embodiments, the solvent purified by the methods and systems described herein can have each type of metal impurities (e.g., containing one of Cu, Fe, Cr, K, Ni, and Zn) or an element metal (e.g., Cu, Fe, Cr, K, Ni, or Zn) at an amount of at most about 5 ppb (e.g., at most about 1 ppb, at most about 500 ppt, at most about 100 ppt, at most about 80 ppt, at most about 60 ppt, at most about 50 ppt, at most about 30 ppt, at most about 20 ppt, at most about 15 ppt, at most about 12 ppt, at most about 10 ppt, at most about 8 ppt, at most about 6 ppt, at most about 5 ppt, at most about 4 ppt, at most about 2 ppt, or at most about 1 ppt) and/or 0 ppt of the solvent.

In some embodiments, the solvent purified by the methods and systems described herein can form a film or coating having an on-wafer particle count of at most about 500 (e.g., at most about 450, at most about 400, at most about 350, at most about 300, at most about 250, at most about 200, at most about 150, at most about 100, at most about 50 or at most about 25) or 0 on an entire wafer (e.g., a 12-inch wafer). In some embodiments, the solvent purified by the methods and systems described herein can form a film or coating having an on-wafer metal count (e.g., either a total on-wafer metal count or an on-wafer metal count of a specific metal such as Fe or Ni) of at most about 100 (e.g., at most about 90, at most about 80, at most about 70, at most about 60, at most about 50, at most about 40, at most about 30, at most about 20, or at most about 10) or 0 on an entire wafer (e.g., a 12-inch wafer). In some embodiments, the solvent purified by the methods and systems described herein can form a film or coating having an defect density (i.e., based on the total count of on-wafer metal and particles) of at most about 1.5 (e.g., at most about 1.4, at most about 1.2, at most about 1, at most about 0.8, at most about 0.6, at most about 0.5, at most about 0.4, at most about 0.2, at most about 0.1, at most about 0.07, at most about 0.05, at most about 0.03, at most about 0.02, at most about 0.01, at most about 0.007, at most about 0.005, at most about 0.004, at most about 0.003) or 0 per square centimeter on an entire wafer (e.g., a 12-inch wafer).

In some embodiments, the solvent can be purified by the methods and systems described herein at a relatively high flow rate. For example, the solvent can be purified at a flow rate (e.g., the flow rate through first filtration system 110 or the flow rate though second filtration system 120) at least about 25 L/min (e.g., at least about 30 L/min, at least about 40 L/min, at least about 50 L/min, at least about 60 L/min, at least about 80 L/min, at least about 100 L/min, or at least about 120 L/min) and/or at most about 170 L/min (e.g., at most about 160 L/min, at most about 150 L/min, at most about 140 L/min, at most about 130 L/min, at most about 120 L/min, at most about 110 L/min, or at most about 100 L/min). In general, the flow rate for purifying a solvent can vary depending on a number of factors, including the nature and viscosity of the solvent to be purified, the temperature, the number of the filters (e.g., those arranged in parallel), the type and number of other equipment used in the purification process. Without wishing to be bound by theory, it is believed that the flow rate of the solvent to be purified cannot be too high to minimize defects on a wafer and to minimize buildup of static electric charges in the inner surface of a conduit or vessel, which can erode the conduit or vessel.

The present disclosure is illustrated in more detail with reference to the following examples, which are for illustrative purposes and should not be construed as limiting the scope of the present disclosure.

EXAMPLES

General Description of Total Trace Metal Measurement

The total trace metal concentration in each solvent sample was tested using ICP-MS (inductively coupled plasma mass spectrometry (ICP-MS). Using a Fujifilm developed method, each sample was tested for the presence of 26 metal species, the detection limit was metal specific, but the typical detection limits were in the range of 0.00010-0.030 ppb. The concentration of each metal species was then totalized to produce the value shown as total trace metal (ppb).

Example 1

4-Methyl-2-pentanol (MIBC) was purified in three purification systems, i.e., purification systems 1, 2, and 3.

Purification system 1 included a cationic ion exchange filter unit 114 and an anion ion exchange filter unit 116. Filter unit 114 included one cationic ion exchange filter 114a arranged in parallel and made from negatively charged high density polyethylene (i.e., IonKleen). Filter unit 116 included one anionic ion exchange filter 116a arranged in parallel and made from positively charged nylon (Nylon EMZ).

Purification system 2 was similar to purification system 1 except that the former did not include filter unit 116. Purification system 3 was similar to purification system 1 except that the former did not include filter unit 114.

The test results are summarized in Table 1 below.

TABLE 1

| Contaminants | Before Purification | Purification System 3 | Purification System 2 | Purification System 1 |
|---|---|---|---|---|
| Copper (ppt) | 45 | 12 | 18 | 9 |
| Chromium (ppt) | 180 | 40 | 100 | 4 |
| Iron (ppt) | 260 | 30 | 35 | 10 |
| Potassium (ppt) | 42 | 23 | 21 | 13 |
| Nickel (ppt) | 12 | 3 | 4 | 1 |
| Zinc (ppt) | 350 | 30 | 230 | 7 |

As shown in Table 1, the amounts of the trace metal in MIBC purified by purification system 1 (which included both a cationic ion exchange filter unit and an anionic ion exchange filter unit) were significantly reduced compared to the amounts of the trace metal in MIBC purified by purification system 2 (which did not included an anionic ion exchange resin) or purification system 3 (which did not included a cationic ion exchange resin).

While the invention has been described in detail with reference to certain embodiments thereof, it will be understood that modifications and variations are within the spirit and scope of that which is described and claimed.

What is claimed is:

1. A method for removing metal impurities from an organic solvent, comprising:
    passing the organic solvent through first and second filter units to obtain a purified organic solvent,
    wherein the first filter unit comprises a first housing and at least one first filter in the first housing, the first filter comprises a filtration medium comprising a positively charged ion exchange resin, and the positively charged ion exchange resin comprises a polyamide;
    wherein the second filter unit is different from the first filter unit and comprises a second housing and at least one second filter in the second housing, the second filter comprises a filtration medium comprising a negatively charged ion exchange resin, and the negatively charged ion exchange resin comprises a polyolefin; and
    wherein the purified organic solvent comprises a metal impurity at an amount of at most about 50 ppt of the purified organic solvent.

2. The method of claim 1, wherein the polyamide is a nylon.

3. The method of claim 1, wherein the polyamide comprises quaternary ammonium groups.

4. The method of claim 1, wherein the polyolefin is high density polyethylene.

5. The method of claim 1, wherein the polyolefin comprises sulfonate groups.

6. The method of claim 1, wherein the first filter unit comprises 1 to 20 first filters, and the second filter unit comprises 1 to 20 second filters.

7. The method of claim 1, wherein passing the organic solvent through the first or second filter unit is performed at a temperature of at most about 80° F.

8. The method of claim 1, further comprising passing the organic solvent through at least one heat exchanger to maintain the temperature of the organic solvent at most about 80° F.

9. The method of claim 1, further comprising passing the organic solvent through at least one particle removal filter unit, wherein the at least one particle removal filter unit is disposed upstream of the first and second filter units, between the first and second filter units, or downstream of the first and second filter units.

10. The method of claim 1, further comprising moving the purified solvent to a packaging station.

11. The method of claim 1, wherein the organic solvent comprises cyclohexanone, ethyl lactate, n-butyl acetate, propylene glycol monomethyl ether, propylene glycol monomethyl ether acetate, 4-methyl-2-pentanol, or propylene carbonate.

12. The method of claim 1, wherein the organic solvent comprises metal impurities comprising a metal selected from the group consisting of alkali metals, alkaline earth metals, main group metals, transition metals, and lanthanide metals.

13. The method of claim 12, wherein the metal impurities comprises a metal selected from the group consisting of Cu, Fe, Cr, K, Ni, and Zn.

14. The method of claim 12, wherein the purified organic solvent comprises a metal impurity at an amount of at most about 15 ppt of the purified organic solvent.

15. A system, comprising:
    first and second filter units in fluid communication with each other,
    wherein the first filter unit comprises a first housing and at least one first filter in the first housing, the first filter comprises a filtration medium comprising a positively charged ion exchange resin, and the positively charged ion exchange resin comprises a polyamide;
    wherein the second filter unit is different from the first filter unit and comprises a second housing and at least one second filter in the second housing, the second filter comprises a filtration medium comprising a negatively charged ion exchange resin, and the negatively charged ion exchange resin comprises a polyolefin; and
    wherein the system is configured to purify an organic solvent to form a purified organic solvent comprising a metal impurity at an amount of at most about 50 ppt of the purified organic solvent.

16. The system of claim 15, wherein the polyamide is a nylon.

17. The system of claim 15, wherein the polyamide comprises quaternary ammonium groups.

18. The system of claim 15, wherein the polyolefin is high density polyethylene.

19. The system of claim 15, wherein the polyolefin comprises sulfonate groups.

20. The system of claim 15, wherein the first filter unit comprises 1 to 20 first filters, and the second filter unit comprises 1 to 20 second filters.

21. The system of claim 15, further comprising at least one heat exchanger upstream of the first and second filter units, between the first and second filter units, or downstream of the first and second filter units.

22. The system of claim 15, further comprising at least one particle removal filter unit upstream of the first and second filter units, between the first and second filter units, or downstream of the first and second filter units.

* * * * *